C. H. SIMPSON.
HARVESTER ATTACHMENT.
APPLICATION FILED APR. 8, 1916.
1,228,841.
Patented June 5, 1917.
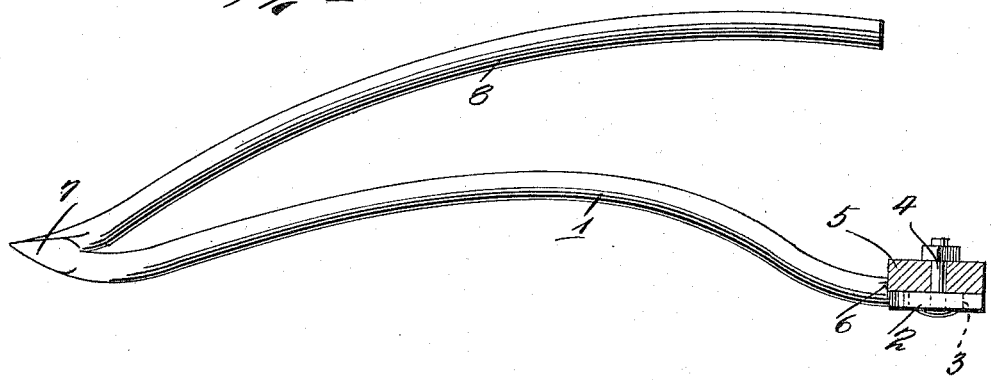
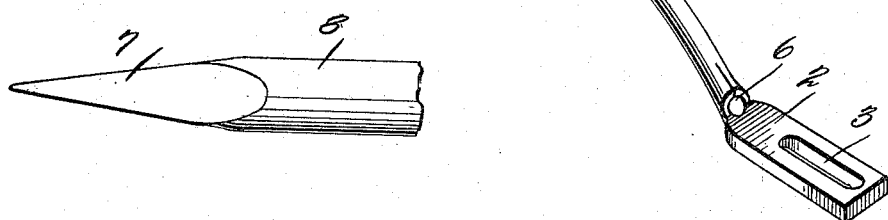
Witnesses
Inventor
C. H. Simpson.

UNITED STATES PATENT OFFICE.

CHARLES H. SIMPSON, OF LAUREL, NEBRASKA.

HARVESTER ATTACHMENT.

1,228,841. Specification of Letters Patent. Patented June 5, 1917.

Application filed April 3, 1916. Serial No. 89,832.

*To all whom it may concern:*

Be it known that I, CHARLES H. SIMPSON, a citizen of the United States of America, residing at Laurel, in the county of Cedar and State of Nebraska, have invented certain new and useful Improvements in Harvester Attachments, of which the following is a specification, reference being had therein to the accompanying drawing.

This invention relates to harvester attachments, and has for its principal object the production of a simple and efficient attachment which is adapted to pick up and hold lodged or fallen grain until the same is reached or cut by the sickle or mower bar.

Another object of this invention is the production of a simple and efficient attachment or guard which may be conveniently supported upon any mower bar without changing the construction of the guard.

A still further object of this invention is the production of a simple and comparatively inexpensive guard which consists of one piece of metal, and which may be quickly and efficiently attached to a mower bar.

Other objects and advantages of the present invention will appear throughout the following specification and claim.

In the accompanying drawing:—

Figure 1 is a side elevation of the guard or attachment.

Fig. 2 is a perspective view thereof.

Fig. 3 is a top plan view of the forward end of the guard.

By referring to the drawing it will be seen that 1 designates the main body of the guard which is provided at its rear end with a flat foot 2, having an elongated longitudinally extending aperture 3 formed therein, through which aperture 3 is adapted to pass a bolt 4 for connecting the guard 1 to a mower bar or other support 5. The body of the guard is circular in cross-section, and is provided with a vertically extending abutting face 6 which is adapted to rest against the front face of the support 5 and constitute a brace for the guard and prevent the twisting of the same upon the supporting bolt 4. The body of the guard 1 is bulged or bowed upwardly at the center thereof and terminates in a downwardly extending forward end having a tapering or pointed projection 7 as illustrated clearly in the drawing. An upwardly extending guarding bar 8 extends from the forward pointed end of the body 1, and this guard 8 is bowed upwardly and extends rearwardly and in the same vertical plane as the body 1, the guard 8 extending directly over the body 1 throughout its entire length.

It should be understood that the bracing guard is formed of milled soft steel, and that owing to the fact that the rear end 2 is provided with a longitudinally extending slot, the guard may be adjusted to any desired form of support.

It should be understood that the guarding bar or member 8 will pick up the twisted or fallen grain and cause the same to be drawn to such a position as to be cut efficiently by the mower bar adapted to carry the guard.

Having thus described the invention what is claimed as new, is:—

As a new article of manufacture, a harvester attachment comprising a main body having a flat foot upon the rear end thereof, said flat foot provided with an elongated longitudinally extending aperture, said body being substantially circular in cross section and projecting above the flat foot, a shoulder at the junction between said body and flat foot, said shoulder being adapted to rest against the front edge of a finger bar for assisting in holding said body against lateral twisting movement, securing means adapted to pass through said longitudinally extending aperture, the forward end of said body being curved upwardly at the center thereof and having an integral upwardly extending curved guarding bar secured to the forward end thereof and being formed integral therewith.

In testimony whereof I hereunto affix my signature.

CHARLES H. SIMPSON.

Copies of this patent may be obtained for five cents each, by addressing the "Commissioner of Patents, Washington, D. C."